United States Patent [19]

Hart et al.

[11] Patent Number: 5,193,292

[45] Date of Patent: Mar. 16, 1993

[54] METHOD AND APPARATUS FOR AUTOMATICALLY TERMINATING THE CYCLE IN DRYERS

[76] Inventors: Douglas R. S. Hart, 94 Yarmouth Road, Toronto, Ontario, Canada, M6G 1W9; David M. Jones, 19 Brentwood Drive, Dundas, Ontario, Canada, L9H 3N2

[21] Appl. No.: 867,532

[22] Filed: Apr. 13, 1992

[30] Foreign Application Priority Data

Dec. 10, 1991 [GB] United Kingdom ................. 9126200

[51] Int. Cl.⁵ .............................................. F26B 3/00
[52] U.S. Cl. .......................................... 34/30; 34/48; 34/55
[58] Field of Search ................... 34/43, 45, 46, 48, 55, 34/30

[56] References Cited

U.S. PATENT DOCUMENTS

4,640,022  2/1987  Suzuki et al. ............................ 34/48
4,842,192  6/1989  Range et al. ......................... 34/48 X Primary Examiner—Henry A. Bennet
Attorney, Agent, or Firm—Shoemaker and Mattare Ltd.

[57] ABSTRACT

A control device that is constructed in the form of a plug adaptor that can interrupt the power to the dryer when the load is dry. The pattern of the change in power consumption levels of the dryer is used, together with a control algorithm, to provide the information needed for the control decision. The device provides a superior means of determining the cycle termination point which could also be incorporated directly into dryers at the point of manufacture.

39 Claims, 5 Drawing Sheets

METHOD AND APPARATUS FOR AUTOMATICALLY TERMINATING THE CYCLE IN DRYERS

This invention relates to the control of dryers in general and in particular to electrically powered clothes dryers for residential use.

BACKGROUND OF THIS INVENTION

Many electric clothes dryers have an automatic setting that can terminate the cycle when the clothes are dry, to save energy. However, many of the dryers now in use do not have this feature, and independent tests indicate that many models incorporating automatic termination still overdry the clothes, thereby wasting up to 20% of the electricity or more.

Conventional automatic termination systems in dryers today may use the dryer temperature or the humidity of the air or the electrical conductivity of the load itself to determine when to terminate the cycle. Frequently, the decision is made by allowing a given amount of heater-on or heater-off time to elapse after a predetermined threshold is reached. This elapsed time is usually determined by a user set point on the control dial of the dryer.

Consumer reports and tests by others indicate that while these automatic shut-off mechanisms are somewhat effective, they frequently overdry the loads, in many cases running longer than necessary, after the load is dry. This not only wastes energy, but it causes unnecessary wear on the fabric and to the dryer itself.

GENERAL DESCRIPTION OF THIS INVENTION

This invention seeks to improve upon the current means of control and in addition to provide a simple retrofit means whereby this improved control can be extended to existing clothes dryers, without modification to the interior wiring of the dryer itself.

The improved means of control derives from two sources. First, it is recognized that since dryers seek to maintain an average air temperature in the drum during the drying cycle, then as the load dries, less and less power is required by the dryer to maintain this temperature as the quantity of water evaporating is reduced. By monitoring the power used by the dryer a means can be provided to determine the end point of the cycle, which is not vulnerable to the drift of an external sensor or to variations in any other external input.

Secondly, in this invention, the determination of dryness is not based simply on one or two input variables or thresholds (such as a humidity threshold, or a user set point), but rather on a series of data derived from the power used by the dryer heater. Through the use of a microcomputer and continuous input data, more accurate information may be derived regarding the condition of the load and its termination point. This control method is also more responsive to different cycles, different loads and different dryer types, since for each load, the control mechanism adapts to the pattern of power use for that particular load and dryer cycle.

This invention also seeks to provide a product that can be fitted easily to existing dryers. In such retrofit applications, the product can be installed without interfering with the internal wiring of the dryer. In the case of a domestic clothes dryer, both the power sensing means and the controlling means may be incorporated into a plug adaptor, thus requiring no expense for installation and no alteration of existing electrical components inside the dryer. Unlike other electrical adaptors which provide timer or control functions, the device does not require external inputs or threshold set-points. Rather, it uses continuous data provided by the pattern of power usage transmitted through the device itself.

In typical North American use, the device and its means of control are estimated to save at least 180 KWH per year per clothes dryer. It is recognized that the control means described herein may apply equally to a control system that is installed interior to new dryers and to a retrofit application for existing dryers. It is further recognized that the power used by the dryer heater may also be sensed indirectly. For example the heater status of an electric dryer may be determined by monitoring the drum air temperature as it cycles up and back within its given temperature limits.

Not only does the invention save energy, but by preventing overdrying, it saves fabric wear. In addition, by reducing the running time of the dryer, it may extend the lifetime of the dryer itself, perhaps by as much as 20%. By providing a more effective control, the device also provides the convenience to the user of knowing that when the dryer stops, the laundry is ready and not still damp.

This invention operates by sensing the power level used by the dryer and through the use of a logic algorithm and a microcomputer, determines the level of dryness of the load. In the case of a clothes dryer, the device temporarily interrupts the power to the dryer when the laundry is dry. Any substantial power interruption to the dryer motor trips the reset button on the dryer itself, thus terminating the cycle. By using the safety reset function of the dryer itself, the need for a separate reset on the device itself is avoided.

The logic of the device rests on the fact that temperature limits are maintained by the dryer during operation. As moisture is eliminated from the load, less and less power is required to maintain the dryer at temperature. By watching the pattern or function of power use vs. time, and by the application of a software algorithm, the device can determine when dryness is achieved and terminate the cycle. The software algorithm relies on the pattern of power use of the heater during the drying process. Particular patterns are characteristic of particular loads and dryer cycles. Furthermore, experience with the particular dryer where it is installed may also allow the device to "learn" and refine its termination routine, thereby improving its performance over time on a given dryer.

As a further refinement of the invention in domestic clothes dryers, it is possible to terminate the heater portion of the electrical supply independently of the dryer motor portion, since the motor normally uses only one side of the 220 volt supply line, whereas the heater requires both sides. If the non-motor side only is interrupted, then with many dryers the motor will continue to operate and the drum will turn; however, the heater will be off. This condition is desirable because it prevents the clothes from lying in a heap and wrinkling in a stationary dryer. However at the same time it saves the much larger power level used by the heater. This feature would be particularly attractive for permanent press clothing and could be user selectable through a switch on the unit or on a remote keypad.

During normal operation in most dryers, the heater is being switched on and off by thermostats, to maintain the load within a certain temperature range. Another refinement of the operation of the device could allow termination to occur only toward the end of a power-off phase of the heater cycle. This would prevent electrical arcing and wear on the relay contacts that are often associated with the switching of high current loads. By allowing the dryer to run for a period in this power-off phase, rather than simply shutting off the system, the heat latent in the drum and the clothes is also put to good use. This also provides a period of time where an audible alarm can sound to warn users that the laundry is ready.

It is recognized that this control strategy could be applied to other types of dryers in commercial and industrial applications, or to any situation where the dryer load is constant and fixed temperature limits are maintained. Non-electric dryers would also be suitable for this invention. It is also recognized that the control strategy described herein could be built in to new dryers, as a means of providing superior control of the drying cycle of the control.

As an option, the device could also include a control keypad that is connected by a wire and mounted on the control panel of the dryer. The control keypad could allow enhanced user control of the dryness of the load, or provide an override feature on the device, or engage the permanent press feature, if desired. The unit could also incorporate an LED or other indicator on the keypad or on the case of the adaptor itself, to indicate proper operation.

Another refinement of the device could be incorporated to make it even more effective for particular makes or models of dryers. In such cases, selection switches or dip switches may be incorporated into the product to refine the algorithm for the particular dryer characteristics. Where the device is incorporated into the dryer itself, such refinements can be pre-adjusted and not require selection.

More particularly, this invention provides a method of controlling a drying machine to which energy is fed along at least one conduit, the drying machine having means establishing a variable energy consumption, such that, as the contents of the drying machine approach a dry condition, the amount of energy consumed per unit time decreases in a pattern which depends upon the amount and nature of the contents and the characteristics of the drying machine, the method comprising the steps:

a) monitoring the said pattern of energy consumption, and b) when the pattern of energy consumption with respect to time corresponds to a pattern which indicates a condition of dryness, reducing the flow of energy along said at least one conduit.

Further, this invention provides, for use in conjunction with a drying machine to which energy is fed along at least one conduit, the drying machine having means establishing a variable energy consumption such that, as the contents of the drying machine approach a dry condition, the amount of energy used per unit time decreases, in a pattern which depends upon the amount and nature of the contents and the characteristics of the drying machine, a control device comprising:

a) first means for monitoring the pattern of energy used per unit time, and b) second means receiving data from said first means and adapted, when the pattern of energy consumption with respect to time corresponds to a pattern which indicates a condition of dryness, to reduce the flow of energy along said at least one conduit.

Additionally, this invention provides, in combination:

A. a drying machine to which energy is fed along at least one conduit, the drying machine having means establishing a variable energy consumption such that, as the contents of the drying machine approach a dry condition, the amount of energy used per unit time decreases in a pattern which depends upon the amount and nature of the contents and the characteristics of the drying machine, and B. a control capability comprising:

a) first means for monitoring the pattern of energy consumption per unit time, and b) second means receiving data from said first means and adapted, when the pattern of energy consumption with respect to time corresponds to a pattern which indicates a condition of dryness, to reduce the flow of energy along said at least one conduit, the control capability being built into the drying machine.

Finally, this invention provides, in combination:

A. a clothes drying machine incorporating a heater, a drum, a motor rotating the drum, and an air blower run by said motor, electrical energy being fed to the heater and the motor along two "live" electrical wires of a 220-volt electrical supply which further includes a neutral wire and a ground wire, all wires proceeding from a plug having prongs for insertion into an appropriate receptacle, the machine having a built-in safety feature whereby it shuts down the machine's use of the electrical energy by the heater and motor whenever there is an interruption in the availability of electrical energy to the motor, the drying machine having means establishing a variable energy consumption such that, as the contents of the drying machine approach a dry condition, the amount of energy used per unit time decreases in a pattern which depends upon the amount and nature of the contents and the characteristics of the drying machine, and B. a control device comprising:

a) first means for monitoring the pattern of energy consumption, and b) second means receiving data from said first means and adapted, when the pattern of energy consumption with respect to time corresponds to a pattern which indicates a condition of dryness, to reduce the flow of electrical energy in at least one of said "live" wires, the control device being separate from the drying machine, and incorporated into an adaptor unit having prongs for insertion into an appropriate receptacle, and itself defining a receptacle for the prongs on the said plug for the said drying machine, said adaptor unit also containing said first and second means.

GENERAL DESCRIPTION OF THE DRAWINGS

One embodiment of this invention is illustrated in the accompanying drawings, in which like numerals denote like parts throughout the several views, and in which:

FIG. 6 (6A, 6B and 6C) is a logic flow chart for the main operations of the microprocessor.

DETAILED DESCRIPTION OF THE DRAWINGS

Figure 1:
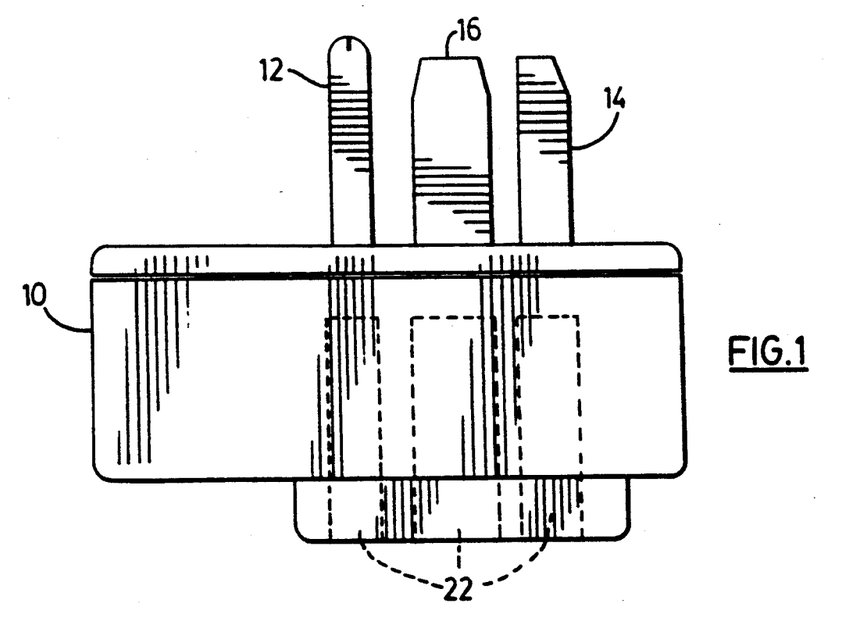
FIG. 1 is a side elevational view of the special adaptor of this invention.

In FIG. 1 the adaptor is shown at 10, and is seen to incorporate the usual prongs for insertion into the standard four-prong wall receptacle for a clothes dryer. Specifically, the prongs include a ground 12, a neutral 14 and two "live" prongs 16 between which the voltage is approximately 220 volts, for standard dryers. In FIG. 1, the nearer live prong 16 hides the further live prong.

Figure 2:
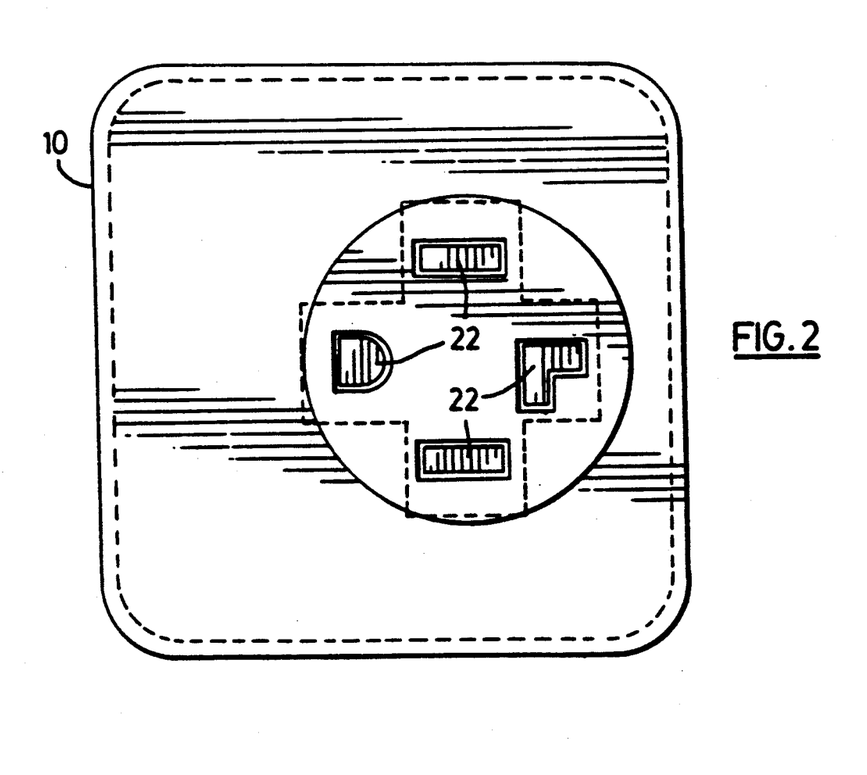
FIG. 2 is a bottom plan view of the adaptor shown in FIG. 1.

The adaptor 10 is intended to function in place of the standard wall receptacle for a dryer plug 18 (see FIG. 4) which also incorporates a ground prong, a neutral prong 20, and two "live" prongs 22 and 24. These latter prongs enter suitable receiver openings in the adaptor 10, these openings being illustrated in broken lines 22 (FIG. 1). The bottom plan view shown in FIG. 2 shows the receiver openings 22 of the adaptor 10.

Figure 5:
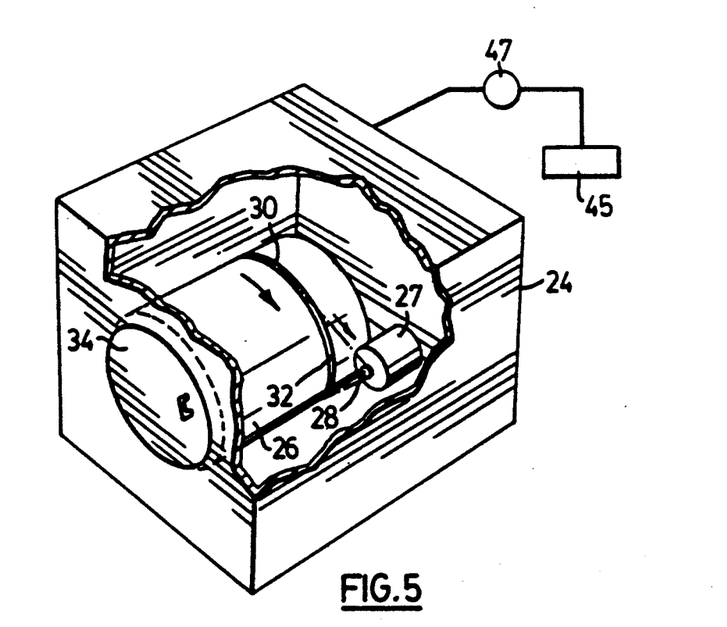
FIG. 5 is a partly broken-away, perspective view of a dryer of the kind contemplated by the present invention.

FIG. 5 is a partly broken-away prespective view of a dryer 24 which incorporates a drum 26, an electric motor 27 which rotates a small pulley 28 around which is entrained a belt 30 which may follow a groove 32 in the outside of the drum 26. Typically, a circular door 34 in the casing of the dryer 24 permits access to the interior of the drum 26.

Figure 3:
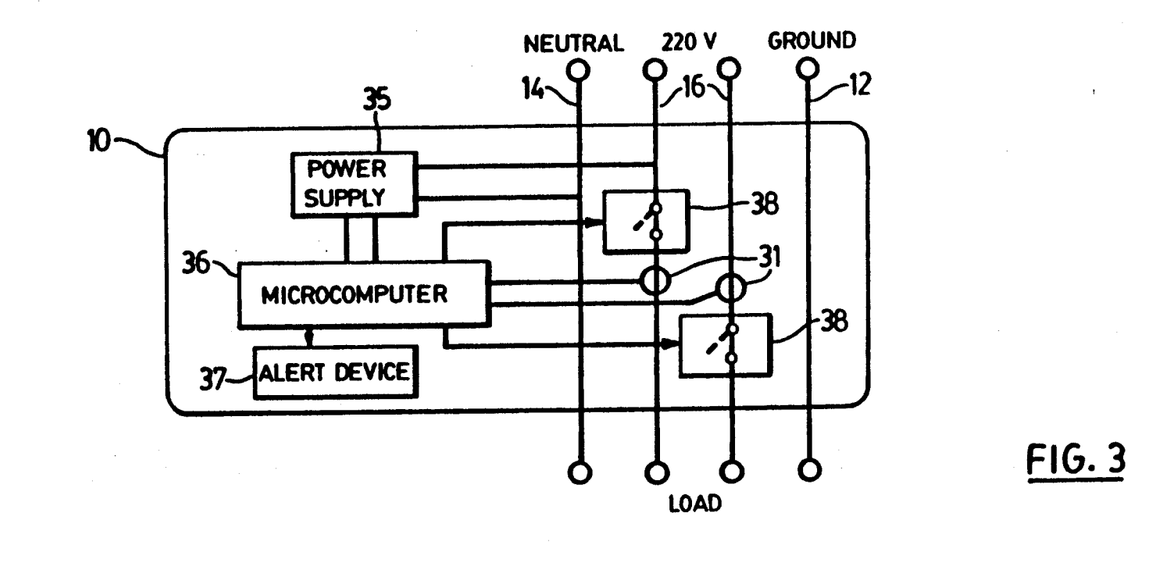
FIG. 3 is a block diagram of the major electronic components of this invention.

Attention is now directed to FIG. 3. The decision process for cycle termination is handled by a microcomputer 36 which is mounted inside the casing of the adaptor 10. The microcomputer may be powered by a power supply 35, connected to the line power. The microcomputer 36 monitors the process of the drying cycle using current sensing devices 31, which are isolated from the line voltage.

The current sensing devices 31 give information about the actual amount of current or power draw in each conductor and this can allow the microcomputer 36 to determine the power consumption of the heater(s) of the dryer (in the case of an electric dryer) as well as that of the electric motor. In addition, the microcomputer can calculate the duty cycle of the heaters, in cases where thermostats maintain the temperature between fixed temperature limits. This duty cycle, or ratio of ON to OFF time is a further indicator of the power consumption of the dryer, and may be used for purposes of calculating the dryness of the load. In the case of non-electric fuels, sensors could determine the duty cycle, for example by sensing the ON and OFF time of a gas valve.

With this information, and a software algorithm which evaluates the pattern of power use for the load being dried, the microcomputer 36 calculates the point at which the moisture of the load is appropriate for cycle termination. In many cases, this moisture level is between 1% and 5% of the bone dry weight. Termination may be accomplished by momentarily interrupting the power conductors (connected to prongs 16) of the dryer, using solid state switches or relays 38. In the case where it is desirable to interrupt only the heater and leave the drum tumbling, only one conductor of the 220 V line would be interrupted, and only for a period of time to allow the clothes to cool "in motion". After this period, the second conductor could be momentarily interrupted, terminating the tumbling. For many dryers, termination may also be accomplished by interrupting only the conductor that powers the motor. By sensing both current lines, the microcomputer can identify which line carries the motor current.

Sensing the ON-OFF heating cycle also gives the device the capability to be factory programmed to delay termination until the end of a "HEATER OFF" phase of the operation, rather than elsewhere in the cycle. In this way, the load to be dried receives the benefit of the "free" heat in the dryer, before the thermostat can restart the heater.

Optionally, the adaptor can activate an alert device 37, such as a light or sound signal when it terminates the dryer operation, much like a microwave oven, in order to notify the user that operation has been completed. In some conditions, the sound signal could start with a gentle signal prior to termination, to warn users that termination was coming. This would prepare the user to allow him to remove the clothing exactly on termination, thus reducing wrinkles that build up when the load stands in the dryer.

Figure 4:
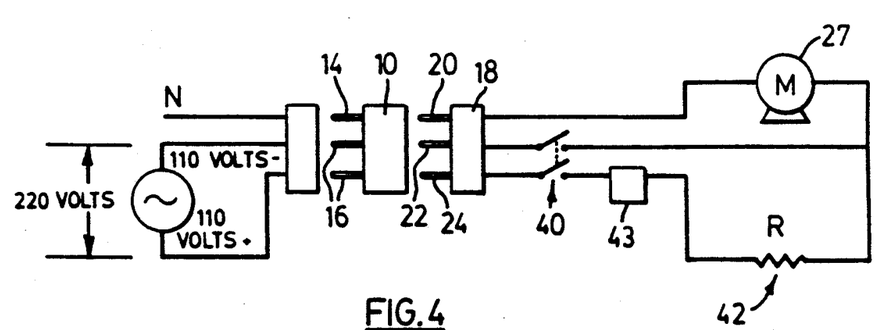
FIG. 4 is a simplified schematic drawing showing the essential hook-up for a dryer, showing how the invention interacts with the dryer plug and the receptacle.

Attention is now directed to FIG. 4, which shows a simplified wiring diagram to illustrate the position of the adaptor. At the left in FIG. 4, two wires are shown which carry 110 V each, oppositely phased. Also illustrated is a two-pole single-throw switch 40 which is adapted to open both of the "live" lines simultaneously. This switch represents the normally much more complicated switching arrangement built into a standard domestic or industrial dryer. FIG. 4 illustrates the motor 27, a thermostat 43, and also a resistance 42 which represents the heating element which supplies heat to the inside of the drum 26.

In FIG. 5, an option is shown whereby the heating element for the dryer can be powered by a fluid fuel, such as natural gas. A source of such fuel under pressure is shown at 45, from which a fuel line, having a controllable valve 47, extends to the dryer 24.

Figure 6A:
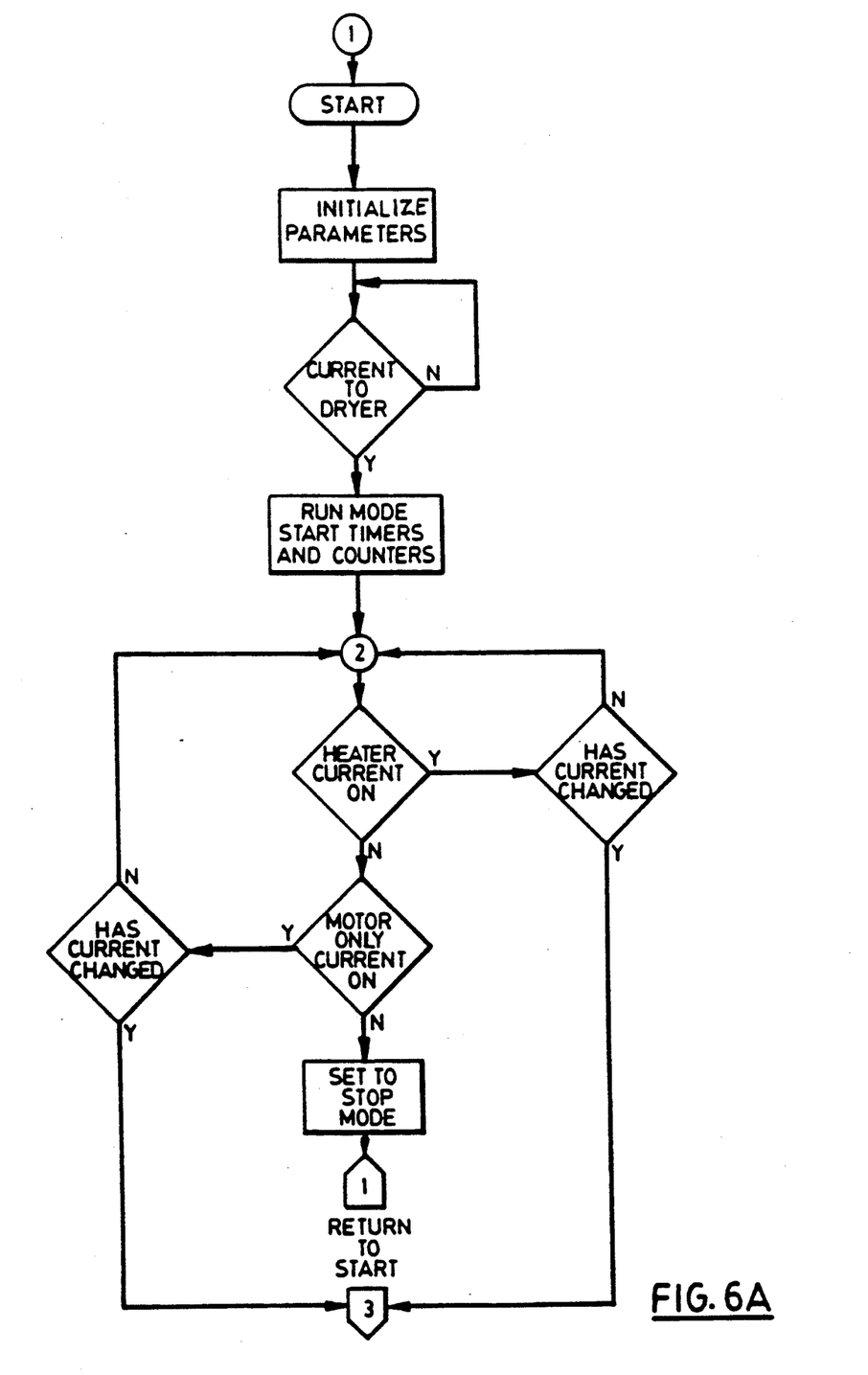

Attention is now directed to FIG. 6, in which the flow chart for the microcomputer is shown in three parts, A, B and C, on separate pages. On power-up (shown in FIG. 6A) when the unit is initially connected to the 220 V lines or after it has completed any one dryer cycle, the unit begins at "start" (1) and initializes all data collection parameters. In this state, the microcomputer continually monitors current to the dryer in a standby mode.

When the dryer is started by the operator, the current draw is sensed by the microcomputer and it enters a run mode, starting internal counters and timers. Using information from the current sensors, the microcomputer then monitors whether the heater is on, the power level that the heater is using, whether the motor only is on, or if the cycle has been terminated.

Attention is now directed to FIG. 6A. While monitoring the dryer current, the microcomputer calculates the duty cycle or fraction of time the heater is operating. Historical duty cycle information is maintained in temporary memory as the timer advances and the ON-OFF cycles of the dryer heater are monitored. The levels of the duty cycle are fitted to a curve and rule checks are performed using this information which assess the dryness of the laundry load. When the rules declare that the load is dry, the microprocessor waits until the heater begins an OFF part of its ON-OFF cycle and sounds a beeper to warn of the future shut-off of the cycle.

Figures 6B, 6C:
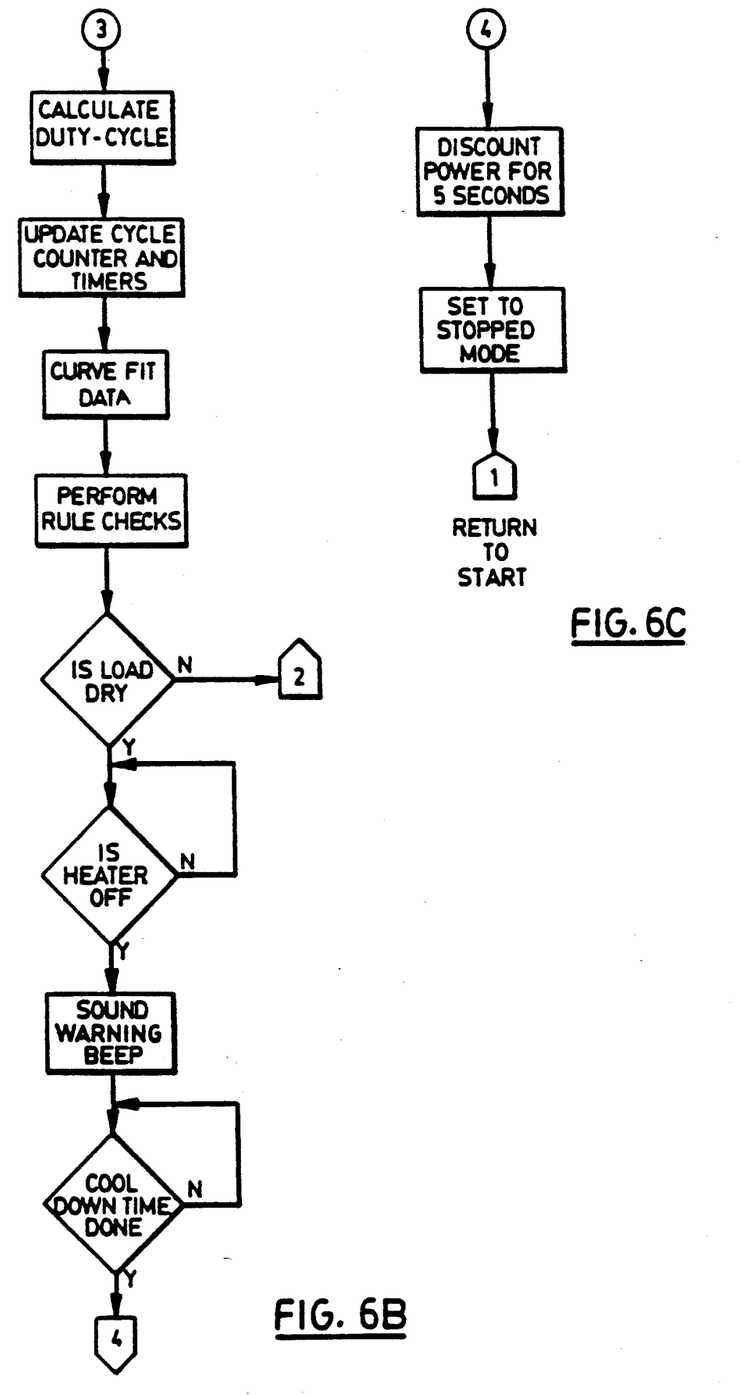

Attention is now directed to FIG. 6C. After a part of the OFF cycle of the heater has passed, and the drum has partially cooled, termination is effected by the microcomputer at (4). The microcomputer activates at least one of the relays for a five second period, sufficient to stop the motor and the rotation of the dryer drum. This in turn trips the safety reset of the dryer itself.

Sensing the ON-OFF heating cycle gives the microcomputer the capability to delay termination until close to the end of a "HEATER OFF" phase of the operation, rather than elsewhere in the cycle. In this way, the load to be dried receives the benefit of the "free" heat in the dryer, before the thermostat can restart the heater. Shutting off the dryer during the "HEATER OFF" phase also reduces wear on the relay, since the current being switched is reduced.

In the appended claims, and in the prior text the expression "reducing the flow of energy" includes both partial and complete blockage of the energy flow.

While one embodiment of this invention has been illustrated in the accompanying drawings and described hereinabove, it will be evident to those skilled in the art that changes and modifications may be made therein, without departing from the essence of this invention.

The embodiments of the invention in which an exclusive property or privilege is claimed are defined as follows:

1. A method of controlling a drying machine to which energy is fed along at least one conduit, the drying machine having means establishing a variable energy consumption, such that, as the contents of the drying machine approach a dry condition, the amount of energy consumed per unit time decreases in a pattern which depends upon the amount and nature of the contents and the characteristics of the drying machine, the method comprising the steps:
   a) monitoring the said pattern of energy consumption, and
   b) when the pattern of energy consumption with respect to time corresponds to a pattern which indicates a condition of dryness, reducing the flow of energy along said at least one conduit.

2. The method claimed in claim 1, in which the energy is contained in a fluid fuel, in which there is a single said conduit along which said fuel is fed, and in which the step of interrupting the flow of energy is carried out by reducing flow of fuel in a valve in said one conduit.

3. The method claimed in claim 2, in which the means establishing a variable energy consumption does so by causing the energy flow to cycle on-off, the timing of the reduction under b) being close to the end of an "off" phase in the duty cycle, in order to take advantage of heat stored in the drying machine and its contents.

4. The method claimed in claim 1, in which the energy is electrical energy, said at least one conduit being an electrically conductive wire, and in which the drying machine has a built-in safety feature whereby it shuts down the machine's use of the electrical energy in said wire whenever there is an interruption in the availability of said electrical energy, such that, whenever the flow of energy is shut off under step b) at least one function of the machine is terminated.

5. The method claimed in claim 1, in which the machine is a clothes dryer, and in which the conduit is one of the two "live" electrical wires of a 220-volt electrical supply which also includes a neutral wire, the machine having an electrical resistance type heating means, an air blower and a drum rotated by an electrical motor, the heating means receiving the full 220 volts across the two "live" wires, the motor being run on 110 volts from one of the "live" wires to the neutral wire, the machine having a built-in safety feature whereby it shuts down the machine's use of the electrical energy in the motor and in the heating means whenever there is an interruption in the availability of electrical energy to the motor, the said step b) being carried out by interrupting the electrical energy in that one of the two "live" wires which does not power the motor, thus terminating the heating while allowing the motor to continue, whereby the motor-driven drum and blower will continue to operate after shut-off of the power to said heating means, thus making use of the heat in the drum and its contents and reducing the creasing of the contents.

6. The method claimed in claim 1, in which the machine is a clothes dryer, and in which the conduit is one of the two "live" electrical wires of a 220-volt electrical supply which also includes a neutral wire, the machine having an electrical resistance type heating means and a drum rotated by an electrical motor, the heating means receiving the full 220 volts across the two "live" wires, the motor being run on 110 volts from one of the "live" wires to the neutral wire, the machine controlling the amount of heat energy supplied per unit time by cycling the heating means through an on-off duty cycle, the machine having a built-in safety feature whereby it shuts down the machine's use of the electrical energy in the motor and the heating means whenever there is an adequate interruption in the availability of electrical energy to the motor, the said step b) being carried out by interrupting the electrical energy at least that one of the "live" wires which feeds the motor, thus terminating the heating and the motor, the interruption being done close to the end of an "off" portion of the duty cycle, thus making use of the heat in the drum and its contents.

7. The method claimed in claim 1, in which, at the time of the reduction of energy flow, an audible and/or visible signal is produced.

8. The method claimed in claim 1, in which, shortly before the reduction of energy flow, a first audible and/or visible "warning" signal is produced, and when the energy flow is actually shut off, a second audible and/or visible signal, different from the first, is produced.

9. The method claimed in claim 6, in which, at the time of the interruption, an audible and/or visible signal is produced.

10. The method claimed in claim 6, in which, shortly before the interruption, a first audible and/or visible "warning" signal is produced, and upon the actual occurrence of interruption, a second audible and/or visible signal, different from the first, is produced.

11. The method claimed in claim 5, in which, after shut-off of the power to the heating means, the motor is allowed to continue for a length of time adequate to allow the drum and its contents to cool, whereupon the electrical energy in the other of the "live" wires is interrupted, thus halting the motor.

12. For use in conjunction with a drying machine to which energy is fed along at least one conduit, the drying machine having means establishing a variable energy consumption such that, as the contents of the drying machine approach a dry condition, the amount of energy used per unit time decreases, in a pattern which depends upon the amount and nature of the contents and the characteristics of the drying machine, a control device comprising:
a) first means for monitoring the pattern of energy used per unit time, and
b) second means receiving data from said first means and adapted, when the pattern of energy consumption with respect to time corresponds to a pattern which indicates a condition of dryness, to reduce the flow of energy along said at least one conduit.

13. The control device claimed in claim 12, in which the energy is a fluid fuel, in which there is a single said conduit along which said fuel is fed, and in which the step of reducing the flow of energy is carried out by controlling a valve in said one conduit.

14. The control device claimed in claim 13, in which the means establishing a variable energy consumption does so by cycling the said valve through an on-off duty cycle, and in which the second means times the shut-off to be close to the end of an "off" phase in the duty cycle, in order to take advantage of heat stored in the drying machine and its contents.

15. The control device claimed in claim 12, in which the energy is electrical energy, said at least one conduit being an electrically conductive wire, and in which the drying machine has a built-in safety feature whereby it shuts down the machine's use of the electrical energy in said wire whenever there is an adequate interruption in the availability of said electrical energy, such that, whenever the pattern of energy use with respect to time indicates a condition of dryness as under step b) at least one function of the machine is terminated.

16. The control device claimed in claim 12, in which the machine is a clothes dryer, and in which the conduit is one of the two "live" electrical wires of a 220-volt electrical supply which also includes a neutral wire, the machine having an electrical resistance type heating means, a drum rotated by an electrical motor and an air blower operated by the electric motor, the heating means receiving the full 220 volts across the two "live" wires, the motor being run on 110 volts from one of the "live" wires to the neutral wire, the machine having a built-in safety feature whereby it shuts down the machine's use of the electrical energy to the motor and heater whenever there is an adequate interruption in the availability of electrical energy to the motor, said second means interrupting the electrical energy in that one of the two "live" wires which does not power the motor, thus terminating the heating while allowing the motor to continue, whereby the motor-driven drum will continue to rotate after shut-off of the power to said heating means, thus making use of the heat in the drum and its contents and reducing creasing of the contents.

17. The control device claimed in claim 12, in which the machine is a clothes dryer, and in which the conduit is one of the two "live" electrical wires of a 220-volt electrical supply which also includes a neutral wire, the machine having an electrical resistance type heating means, a drum rotated by an electrical motor and an air blower operated by the motor, the heating means receiving the full 220 volts across the two "live" wires, the motor being run on 110 volts from one of the "live" wires to the neutral wire, the machine controlling the amount of heat energy supplied per unit time by cycling the heating means through an on-off duty cycle, the machine having a built-in safety feature whereby it shuts down the machine's use of the electrical energy by whenever there is an adequate interruption in the availability of electrical energy to the motor, the said second means being adapted to interrupt the electrical energy at least to the motor, thus terminating the heating and the motor, the shutting down being done at the end of an "off" portion of the duty cycle, thus making use of the heat in the drum and its contents.

18. The control device claimed in claim 12, further comprising third means for producing an audible and/or visible signal when the flow of energy is shut off.

19. The control device claimed in claim 12, further comprises third means which, shortly before the shut-off of energy flow, produces a first audible and/or visible "warning" signal, and when the energy flow is actually shut off, produces a second audible and/or visible signal, different from the first.

20. The control device claimed in claim 17, further comprising third means which, at the time of the interruption, produces an audible and/or visible signal.

21. The control device claimed in claim 17, further comprising third means that, shortly before the interruption, produces a first audible and/or visible "warning" signal, and upon the actual occurrence of interruption, produces a second audible and/or visible signal, different from the first.

22. The control device claimed in claim 16, in which, after shut-off of the power to the heating means, the motor is allowed to continue for a length of time adequate to allow the drum and its contents to cool, whereupon the electrical energy in the other of the "live" wires is interrupted, thus halting the motor.

23. In combination:
A. a drying machine to which energy is fed along at least one conduit, the drying machine having means establishing a variable energy consumption such that, as the contents of the drying machine approach a dry condition, the amount of energy used per unit time decreases in a pattern which depends upon the amount and nature of the contents and the characteristics of the drying machine, and
B. a control capability comprising:
a) first means for monitoring the pattern of energy consumption per unit time, and
b) second means receiving data from said first means and adapted, when the pattern of energy consumption with respect to time corresponds to a pattern which indicates a condition of dryness, to reduce the flow of energy along said at least one conduit, the control capability being built into the drying machine.

24. The combination claimed in claim 23, in which the energy is a fluid fuel, in which there is a single said conduit along which said fuel is fed, and in which the step of reducing the flow of energy is carried out by controlling a valve in said one conduit.

25. The combination claimed in claim 24, in which the means establishing a variable energy consumption does so by cycling the said valve through an on-off duty cycle, and in which the second means times the valve shut-down to be close to the end of an "off" phase in the duty cycle, in order to take advantage of heat stored in the drying machine and its contents.

26. The combination claimed in claim 23, in which the energy is electrical energy, said at least one conduit being an electrically conductive wire, and in which the drying machine has a built-in safety feature whereby it shuts down the machine's use of the electrical energy in heater and the motor whenever there is an adequate interruption in the availability of said electrical energy to the motor, such that, whenever the pattern of energy use with respect to time indicates a condition of dryness as under step b) at least one function of the machine is terminated.

27. The combination claimed in claim 23, in which the machine is a clothes dryer, and in which the conduit is one of the two "live" electrical wires of a 220-volt electrical supply which also includes a neutral wire, the machine having an electrical resistance type heating means and a drum rotated by an electrical motor, the heating means receiving the full 220 volts across the two "live" wires, the motor being run on 110 volts from one of the "live" wires to the neutral wire, the machine having a built-in safety feature whereby it shuts down the machine's use of the electrical energy to the motor and to the heater whenever there is an adequate interruption in the availability of electrical energy to the motor, said second means interrupting the electrical energy in that one of the two "live" wires which does not power the motor, thus terminating the heating while allowing the motor to continue, whereby the motor-driven drum will continue to rotate after shut-off of the power to said heating means, thus making use of the heat in the drum and its contents and reducing creasing of the contents.

28. The combination claimed in claim 23, in which the machine is clothes dryer, and in which the conduit is one of the two "live" electrical wires of a 220-volt electrical supply which also includes a neutral wire, the machine having an electrical resistance type heating means and a drum rotated by an electrical motor, the heating means receiving the full 220 volts across the two "live" wires, the motor being run on 110 volts from one of the "live" wires to the neutral wire, the machine controlling the amount of heat energy supplied per unit time by cycling the heating means through an on-off duty cycle, the machine having a built-in safety feature whereby it shuts down the machine's use of the electrical energy to the motor and heater whenever there is an adequate interruption in the availability of electrical energy to the motor, the said second means being adapted to interrupt the electrical energy at least to that one of the "live" wires that powers the motor, thus terminating the heating and the motor, the interruption being done at the end of an "off" portion of the duty cycle, thus making use of the heat in the drum and its contents.

29. The combination claimed in claim 23, in which the control device further comprises third means for producing an audible and/or visible signal when the flow of energy is shut off.

30. The combination claimed in claim 23, in which the control device further comprises third means which, shortly before the shut-off of energy flow, produces a first audible and/or visible "warning" signal, and when the energy flow is actually shut off, produces a second audible and/or visible signal, different from the first.

31. The combination claimed in claim 28, in which the control device further comprises third means which, at the time of the interruption, produces an audible and/or visible signal.

32. The combination claimed in claim 28, in which the control device further comprises third means that, shortly before the interruption, produces a first audible and/or visible "warning" signal, and upon the actual occurrence of interruption, produces a second audible and/or visible signal, different from the first.

33. The combination claimed in claim 27, in which, after shut-off of the power to the heating means, the motor is allowed to continue for a length of time adequate to allow the drum and its contents to cool, whereupon the electrical energy in the other of the "live" wires is interrupted, thus halting the motor.

34. In combination:
A. a clothes drying machine incorporating a heater, a drum, a motor rotating the drum, and an air blower run by said motor, electrical energy being fed to the heater and the motor along two "live" electrical wires of a 220-volt electrical supply which further includes a neutral wire and a ground wire, all wires proceeding from a plug having prongs for insertion into an appropriate receptacle, the machine having a built-in safety feature whereby it shuts down the machine's use of the electrical energy by the heater and motor whenever there is an interruption in the availability of electrical energy to the motor, the drying machine having means establishing a variable energy consumption such that, as the contents of the drying machine approach a dry condition, the amount of energy used per unit time decreases in a pattern which depends upon the amount and nature of the contents and the characteristics of the drying machine, and
B. a control device comprising:
a) first means for monitoring the pattern of energy consumption, and
b) second means receiving data from said first means and adapted, when the pattern of energy consumption with respect to time corresponds to a pattern which indicates a condition of dryness, to reduce the flow of electrical energy in at least one of said "live" wires,
the control device being separate from the drying machine, and incorporated into an adaptor unit having prongs for insertion into an appropriate receptacle, and itself defining a receptacle for the prongs on the said plug for the said drying machine, said adaptor unit also containing said first and second means.

35. The combination claimed in claim 34, in which the machine has an electrical resistance type heating means and a drum rotated by an electrical motor, the heating means receiving the full 220 volts across the two "live" wires, the motor being run on 110 volts from one of the "live" wires to the neutral wire, said second means interrupting the electrical energy in that one of the two "live" wires which does not power the motor, thus terminating the heating while allowing the motor to continue, whereby the motor-driven drum will continue to rotate after shut-off of the power to said heating means, thus making use of the heat in the drum and its contents and reducing the creasing of the contents.

36. The combination claimed in claim 34, in which the heater is an electrical resistance type heating means receiving the full 220 volts across the two "live" wires, the motor being run on 110 volts from one of the "live" wires to the neutral wire, the machine controlling the amount of heat energy supplied per unit time by cycling the heating means through an on-off duty cycle, the said second means being adapted to interrupt the electrical energy at least to that one of the "live" wires that powers the motor, thus terminating the heating and the motor, the interruption being done close to the end of an "off" portion of the duty cycle, thus making use of the heat in the drum and its contents.

37. The combination claimed in claim 34, in which the control device further comprises third means for producing an audible and/or visible signal when the flow of electrical energy is shut off.

38. The combination claimed in claim 34, in which the control device further comprises third means which, shortly before the shut-off of energy flow, produces a first audible and/or visible "warning" signal, and when the energy flow is actually shut off, produces a second audible and/or visible signal, different from the first.

39. The combination claimed in claim 35, in which, after shut-off of the power to the heating means, the motor is allowed to continue for a length of time adequate to allow the drum and its contents to cool, whereupon the electrical energy in the other of the "live" wires is interrupted, thus halting the motor.

* * * * *